United States Patent
Aronovich et al.

(10) Patent No.: US 10,296,262 B2
(45) Date of Patent: May 21, 2019

(54) ALIGNING TENANT RESOURCE DEMAND IN A MULTI-TIER STORAGE ENVIRONMENT

(71) Applicant: INTERNATIONAL BUSINESS MACHINES CORPORATION, Armonk, NY (US)

(72) Inventors: Lior Aronovich, Thornhill (CA); Samuel M. Black, Aurora (CA)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 147 days.

(21) Appl. No.: 15/422,898

(22) Filed: Feb. 2, 2017

(65) Prior Publication Data

US 2018/0217784 A1 Aug. 2, 2018

(51) Int. Cl.
*G06F 3/06* (2006.01)

(52) U.S. Cl.
CPC ............ *G06F 3/067* (2013.01); *G06F 3/0605* (2013.01); *G06F 3/0649* (2013.01); *G06F 3/0685* (2013.01)

(58) Field of Classification Search
CPC ...... G06F 9/5038; G06F 9/505; G06F 9/4881; G06F 3/067; G06F 3/0631; G06F 3/0613; G06F 3/0659; G06F 3/0604; G06F 3/0653; G06F 3/0605; G06F 3/0649; G06F 3/0685
USPC ......................................................... 711/117
See application file for complete search history.

(56) References Cited

U.S. PATENT DOCUMENTS

| | | | |
|---|---|---|---|
| 8,996,808 B2 | 3/2015 | Hyde, II et al. | |
| 9,298,506 B2 | 3/2016 | Rabinovici et al. | |
| 2014/0214793 A1* | 7/2014 | Tatemura | G06F 17/30306 707/713 |
| 2014/0278692 A1* | 9/2014 | Marwah | G06Q 10/06312 705/7.22 |
| 2014/0359113 A1 | 12/2014 | Krebs et al. | |
| 2015/0172206 A1* | 6/2015 | Anderson | H04L 47/70 709/226 |
| 2017/0132044 A1* | 5/2017 | Kaneko | G06F 3/061 |

OTHER PUBLICATIONS

Suresh et al., "Application Aware Placement and Scheduling for Multi-tenant Clouds," http://perso.uclouvain.be/marco.canini/papers/absinthe.hpiTR-fsoc.pdf (5 pages).
Guo et al., "V-Cache: Towards Flexible Resource Provisioning for Multi-tier Applications in IAAS Clouds," 2013 IEEE 27th International Symposium on Parallel & Distributed Processing (IPDPS), May 20-24, 2013 (12 pages).

* cited by examiner

*Primary Examiner* — Hashem Farrokh
(74) *Attorney, Agent, or Firm* — Griffiths & Seaton PLLC (57) ABSTRACT

Embodiments for managing resources in a tiered data storage system, by a processor device. In response to differing business priorities for executing workloads by a workload manager, a resource plan is generated by an administrator of the workload manager. The resource plan defines what resources of the storage system are allocated to a particular group of tenants and at what time the workloads of the particular group are executed, thereby optimizing utilization of the resources of the storage system.

15 Claims, 7 Drawing Sheets

ALIGNING TENANT RESOURCE DEMAND IN A MULTI-TIER STORAGE ENVIRONMENT

BACKGROUND OF THE INVENTION

Field of the Invention

The present invention relates in general to computing systems, and more particularly to, various embodiments for data storage management within and/or between distributed computing components.

Description of the Related Art

In today's society, computer systems are commonplace. Computer systems may be found in the workplace, at home, or at school. As computer systems become increasingly relied upon, convenient, and portable, the Internet has grown exponentially. Now, more than ever before, individuals and businesses rely upon distributed storage systems (commonly referred to as "the cloud") to store information and data. As wide strides in technological advancement relating to data access devices have been accomplished, there is an ever-growing demand for growth and development within the back end supporting systems that provide and store the data content.

SUMMARY OF THE INVENTION

The present invention provides various embodiments for optimizing workload scheduling, data placement, and resource allocation methods based upon workload anticipation algorithms in multi-tiered storage environments. In one embodiment, a method comprises, in response to differing business priorities for executing workloads by a workload manager, generating a resource plan by an administrator of the workload manager, wherein the resource plan defines what resources of the storage system are allocated to a particular group of the tenants and at what time the workloads of the particular group are executed, thereby optimizing utilization of the resources of the storage system.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Described embodiments and illustrative figures of various embodiments for managing resources in a tiered data storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

Data tiering in large storage environments is a commonly used mechanism to distribute classifications of data over various storage devices based upon performance, operating costs, etc. For example, IBM® Easy Tier™ is a performance function used in storage environments that automatically and non-disruptively migrates frequently accessed data from magnetic media to solid-state drives (SSDs). In this way, the most frequently accessed data is stored on the fastest storage tier, and the overall performance is improved. It works in such a way that every volume is split into logical units called extents. Easy Tier™ is based on algorithms that are developed by IBM Research, which evaluates the access frequency of each extent. Each extent is rated according to the number of I/Os going to that extent. Extents with a high rating, receiving the most I/Os, are marked as "hot" extents and become candidates for migration to SSDs in the same storage pool. In traditional systems, periodically, but no greater than 24 hours, a migration plan is created according to the "heat" of the extents and the data is migrated to the SSD MDisk (managed disk). When the SSD becomes full, and there is a hotter extent to move onto the SSD, the "cooled" extents are migrated back to the lower-tiered MDisk (managed disk). These automated tiering mechanisms may apply to a wide variety of storage architectures, such as a traditional storage area network (SAN), and traditional or erasure coded object storage architectures.

Existing tiered storage systems attempt to optimize the storage therein by moving the less valuable or less accessed data to lower cost tiers. They do this based on an awareness of the attributes of the data that is stored on them, for example: file name, access time, owner, etc. The layout of the data over the different storage tiers impacts how quickly, and hence efficiently, workloads can run. However, there is no awareness within the storage system of what and when that data may be accessed again.

An additional challenge is that these existing storage systems are not coupled with workload managers handling the workloads. As such, they are not aware of the schedules that the workload manager implements, and how the workload manager partitions resources between different contending resource consumers (users/tenants). The workload manager implements a schedule for how the resources of the storage system will be shared between different tenants, as the relative priorities of different tenants will vary over time. The workload manager may provide a plan on how to resolve the resource contention as an expression of time, called a resource plan. The benefit of having such a resource plan is that the resources of the storage system (CPU, memory, storage space, etc.) needed to run workloads from different tenants is less than the sum of the peak load from each tenant, such that the tenants are, in effect, collectively sharing less resources than their peak demands require. This is possible because the workloads each tenant performs is generated at different times.

The storage system is not aware of the relative priorities of the different tenants that are utilizing the storage system, nor is it aware of how these priorities change over time. This is because the information that the workload manager inherently acquires about specific business priorities of the tenants is not available to the storage system. Moreover, the allocation of individual storage tiers to different tenants is static, meaning the temporal allocation of storage tier capacity, both with regard to capacity and Input/Output Operations per Second (TOPS), is not aligned with the actual demand for resources from the workload manager.

As aforementioned, these storage systems provide access to different storage tiers each having different performance characteristics. Read intensive workloads benefit from using a storage tier with high read capacity. Workloads that generate a lot of data benefit from using a storage tier with a high write throughput. Of course, there are many tenants accessing and using the storage so there are natural conflicts, as every tenant competes for access to the best possible storage tier to use for their respective workload, however there is a finite amount of resources available in the storage system/each of the storage tiers.

Accordingly, the mechanisms of the present invention implement such functionality as providing a system than can interface between a workload manager and the multi-tiered storage system. This functionality provides the storage system awareness of the resource demands that the workload manager will place on it when running upcoming workloads. By providing a system that can translate the resource plan known by the workload manager into placement and migration requirements for the storage system, the storage system can provide tiered storage resources that collectively are larger than the physical capacity of the individual storage tiers by migrating data in accordance to a particular resource plan. In this way, a tenant can be granted more capacity (space and TOPS) for a time, than would normally be available in a static system. As a result of providing the resource plan information to the storage system, each tenant can experience improved storage throughput, which will result in a faster time to tangible results and cost savings, than the tenant would achieve without such a system.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
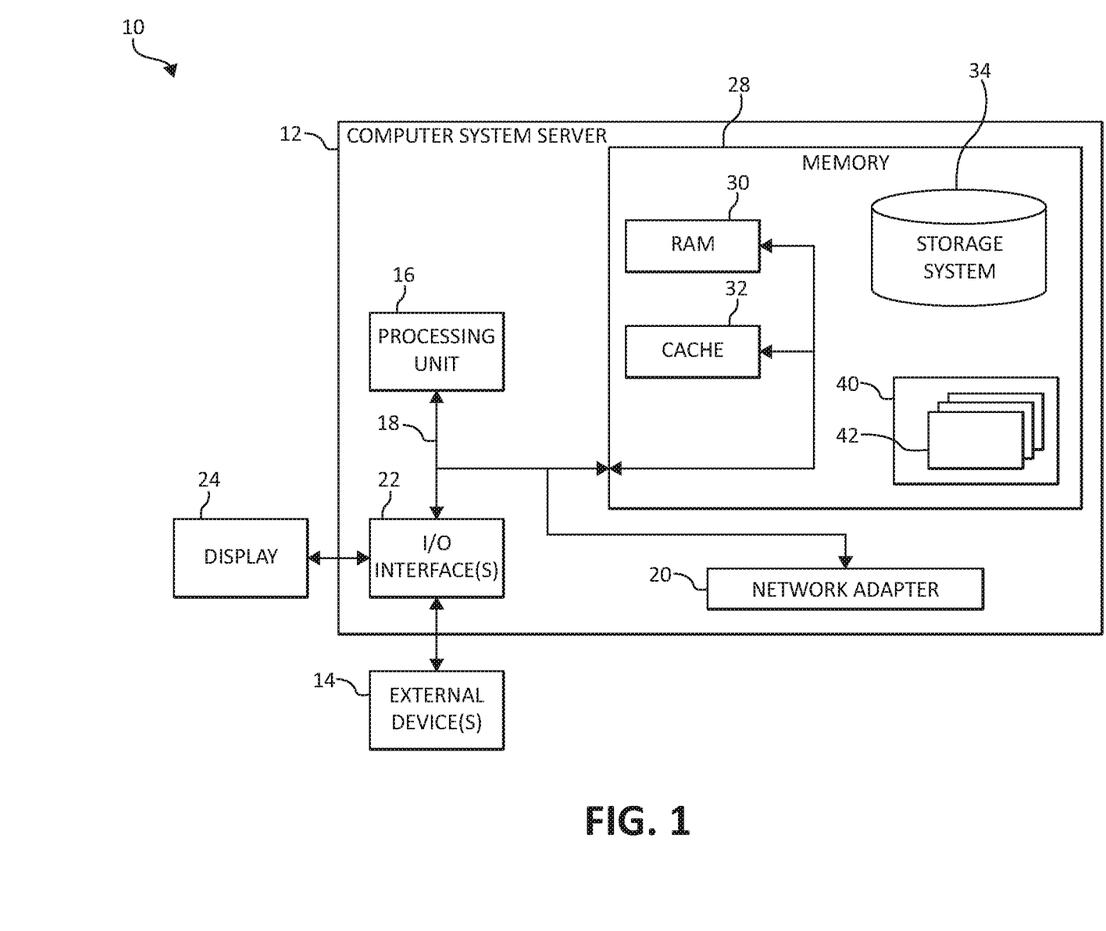
FIG. 1 is a block diagram depicting an exemplary cloud computing node according to an embodiment of the present invention.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10 there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18 by one or more data media interfaces. As will be further depicted and described below, system memory 28 may include at least one program product having a set (e.g., at least one) of program modules that are configured to carry out the functions of embodiments of the invention.

Program/utility 40, having a set (at least one) of program modules 42, may be stored in system memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a user to interact with computer system/server 12; and/or any devices (e.g., network card, modem, etc.) that enable computer system/server 12 to communicate with one or more other computing devices. Such communication can occur via Input/Output (I/O) interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples, include, but are not limited to: microcode, device drivers, redundant processing units, external disk drive arrays, RAID systems, tape drives, and data archival storage systems, etc.

Figure 2:
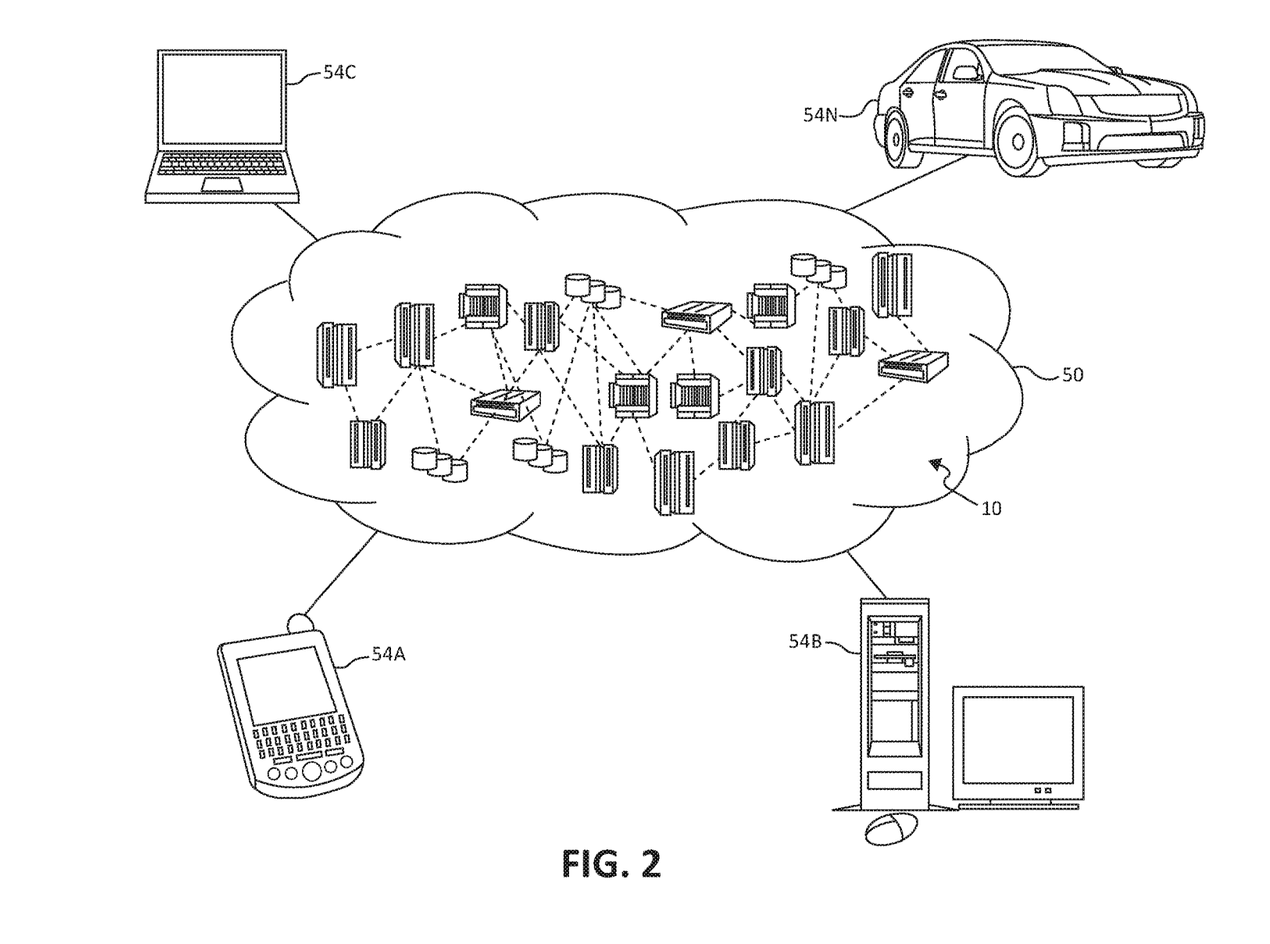
FIG. 2 is an additional block diagram depicting an exemplary cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
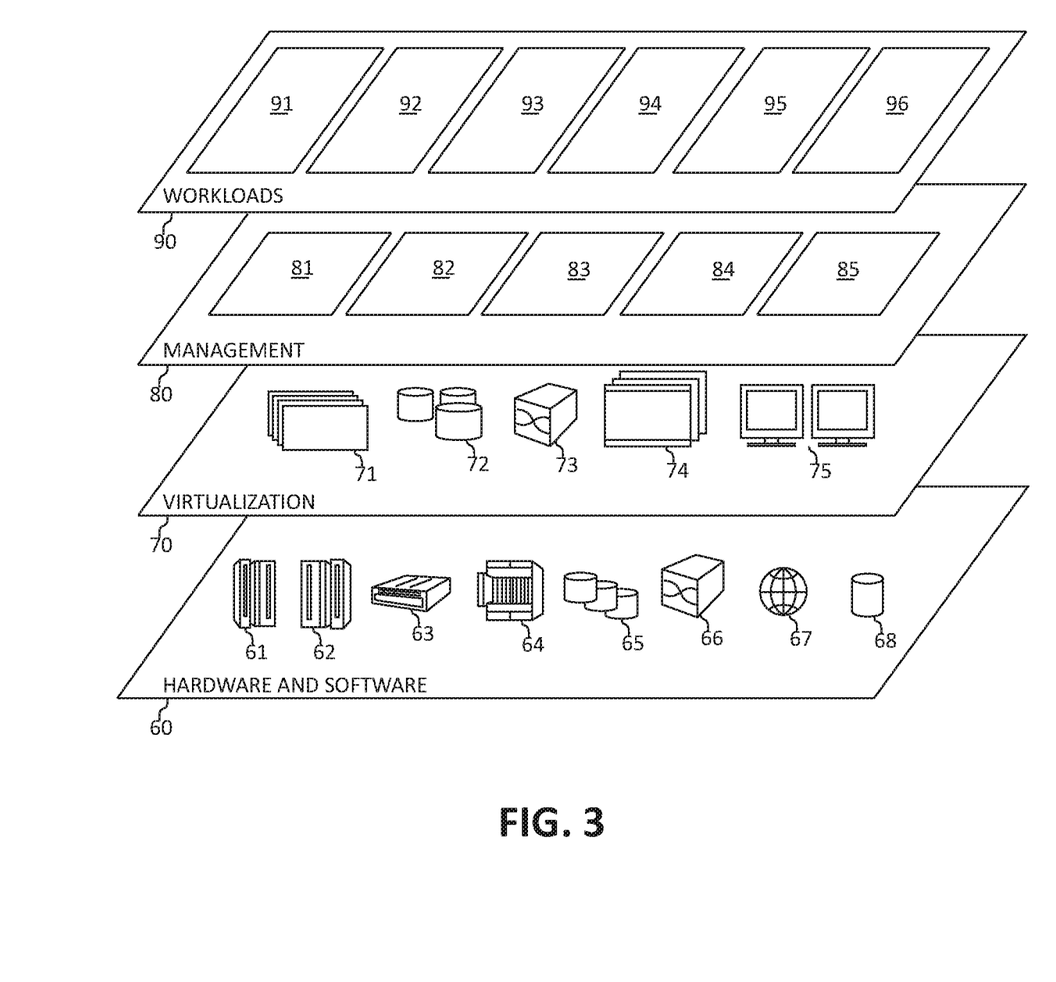
FIG. 3 is an additional block diagram depicting abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provides cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and, in the context of the illustrated embodiments of the present invention, various data security workloads and functions 96, such as antivirus scanning workloads, or anti-malware scanning workloads. In addition, data security workloads and functions 96 may include such operations as data quarantining and/or data deleting functions. One of ordinary skill in the art will appreciate that the data security workloads and functions 96 may also work in conjunction with other portions of the various abstractions layers, such as those in hardware and software 60, virtualization 70, management 80, and other workloads 90 (such as data analytics processing 94, for example) to accomplish the various purposes of the illustrated embodiments of the present invention.

Figure 4:
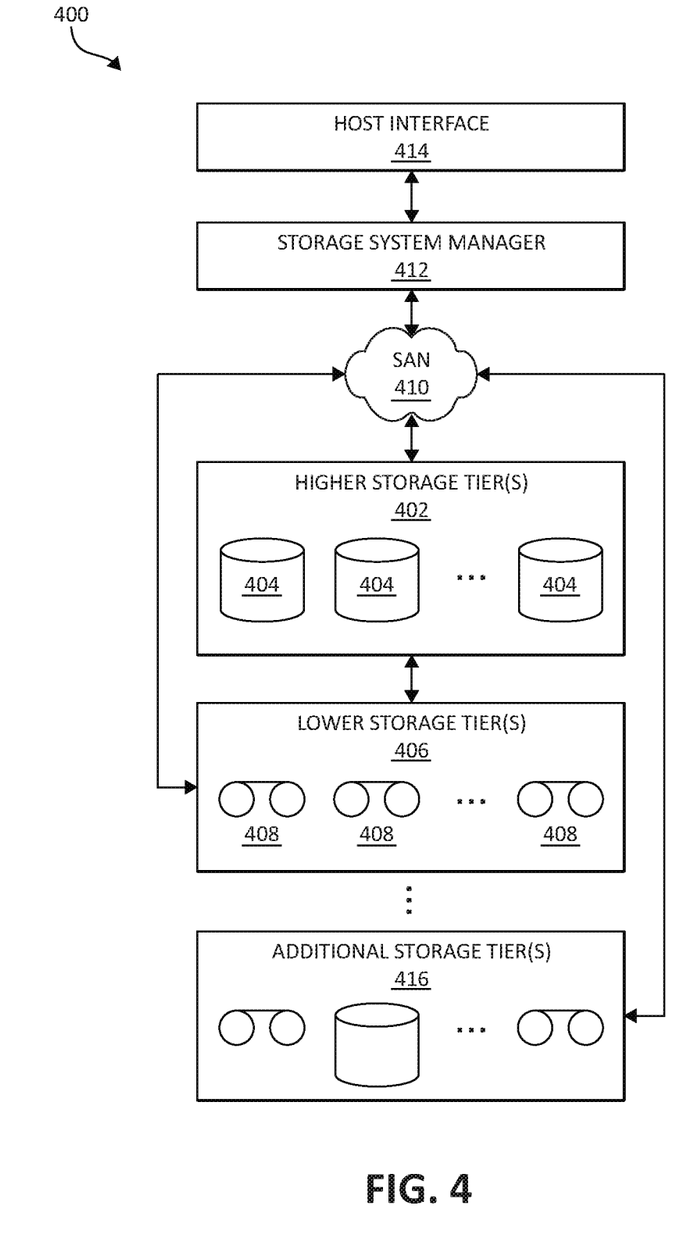
FIG. 4 is an additional block diagram depicting an exemplary hardware structure of a computing storage system in communication with the cloud computing environment, in which aspects of the present invention may be realized.

FIG. 4, following, is an additional block diagram showing a hardware structure of a data storage system 400 that may be used in the overall context (i.e., as a portion of a distributed computing environment) of performing functionality according to various aspects of the present invention.

The storage system 400 may include a storage system manager 412 for communicating with a plurality of media on at least one higher storage tier 402 and at least one lower storage tier 406. The higher storage tier(s) 402 preferably may include one or more random access and/or direct access media 404, such as hard disks in hard disk drives (HDDs), nonvolatile memory (NVM), solid state memory in solid state drives (SSDs), flash memory, SSD arrays, flash memory arrays, etc., and/or others noted herein or known in the art. The lower storage tier(s) 406 may preferably include one or more lower performing storage media 408, including slower accessing HDDs, sequential access media such as magnetic tape in tape drives and/or optical media, etc., and/or others noted herein or known in the art. One or more additional storage tiers 416 may include any combination of storage memory media as desired by a designer of the system 400. Also, any of the higher storage tiers 402 and/or the lower storage tiers 406 may include some combination of storage devices and/or storage media.

The storage system manager 412 may communicate with the storage media 404, 408 on the higher storage tier(s) 402 and lower storage tier(s) 406 through a network 410, such as a SAN, as shown in FIG. 4, or some other suitable network type. The storage system manager 412 may also communicate with one or more host systems (not shown) through a host interface 414, which may or may not be a part of the storage system manager 412. The storage system manager 412 and/or any other component of the storage system 400 may be implemented in hardware and/or software, and may make use of a processor (not shown) for executing commands of a type known in the art, such as a central processing unit (CPU), a field programmable gate array (FPGA), an application specific integrated circuit (ASIC), etc. Of course, any arrangement of a storage system may be used, as will be apparent to those of skill in the art upon reading the present description.

In more embodiments, the storage system 400 may include any number of data storage tiers, and may include the same or different storage memory media within each storage tier. For example, each data storage tier may include the same type of storage memory media, such as HDDs, SSDs, sequential access media (tape in tape drives, optical disk in optical disk drives, etc.), direct access media (CD-ROM, DVD-ROM, etc.), or some predetermined combination of media storage types. In one such configuration, a higher storage tier 402, may include a majority of SSD storage media (up to and including all SSD storage media) for storing data in a higher performing storage environment, and remaining storage tiers, including lower storage tier 406 and additional storage tiers 416 may include any combination of SSDs, HDDs, tape drives, etc., for storing data in a lower performing storage environment. In this way, more frequently accessed data, data having a higher priority, data needing to be accessed more quickly, etc., may be stored to the higher storage tier 402, while data not having one of these attributes may be stored to the additional storage tiers 416, including lower storage tier 406. Of course, one of skill in the art, upon reading the present descriptions, may devise many other combinations of storage media types to implement into different storage schemes, according to the embodiments presented herein.

In one particular embodiment, the storage system 400 may include a combination of SSDs and HDDs, with the higher storage tier 402 including SSDs (and possibly some buffer memory) and the lower storage tier 406 including HDDs (and possibly some buffer memory). According to another embodiment, the storage system 400 may include a combination of SSDs and magnetic tape, with the higher storage tier 402 including SSDs (and possibly some buffer memory) and the lower storage tier 406 including magnetic tape (and possibly some buffer memory). In yet another embodiment, the storage system 400 may include a combination of HDDs and magnetic tape, with the higher storage tier 402 including HDDs (and possibly some buffer memory) and the lower storage tier 406 including magnetic tape (and possibly some buffer memory).

According to some embodiments, the storage system manager 412 may include logic configured to receive a request to open a data set, logic configured to determine if the requested data set is stored to a lower storage tier 406 of a tiered data storage system 400 in multiple associated portions, logic configured to move each associated portion of the requested data set to a higher storage tier 402 of the tiered data storage system 400, and logic configured to assemble the requested data set on the higher storage tier 402 of the tiered data storage system 400 from the associated portions.

Of course, this logic may be implemented as a method on any device and/or system or as a computer program product, according to various embodiments.

Figure 5:
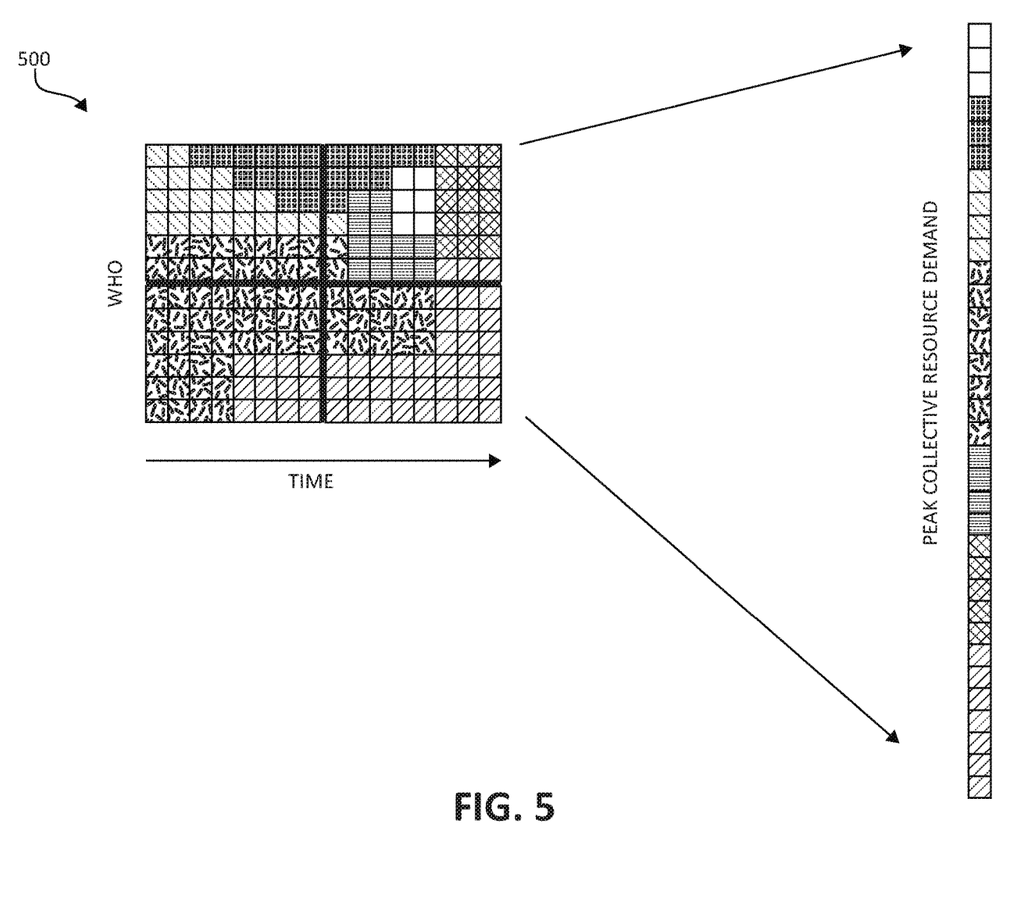
FIG. 5 is a block diagram illustrating a resource plan, in accordance with aspects of the present invention.

Continuing, FIG. 5 is a block diagram illustrating a resource plan 500, in accordance with aspects of the present invention. The differently shaded boxes of resource plan 500 comprise different tenants which will consume certain resources to run their particular workload. The horizontal axis of the resource plan 500 is time. As time progresses, the amount of resources each tenant has available to them changes. At some periods of time, the tenant may have a vast amount of resources available, and at other periods of time very few. It is important to note that if each tenant were to have a static configuration to storage tiers in the storage system to handle the tenant's peak load, it would require considerably more resources. The resource plan 500 will be described further, following.

Figure 6:
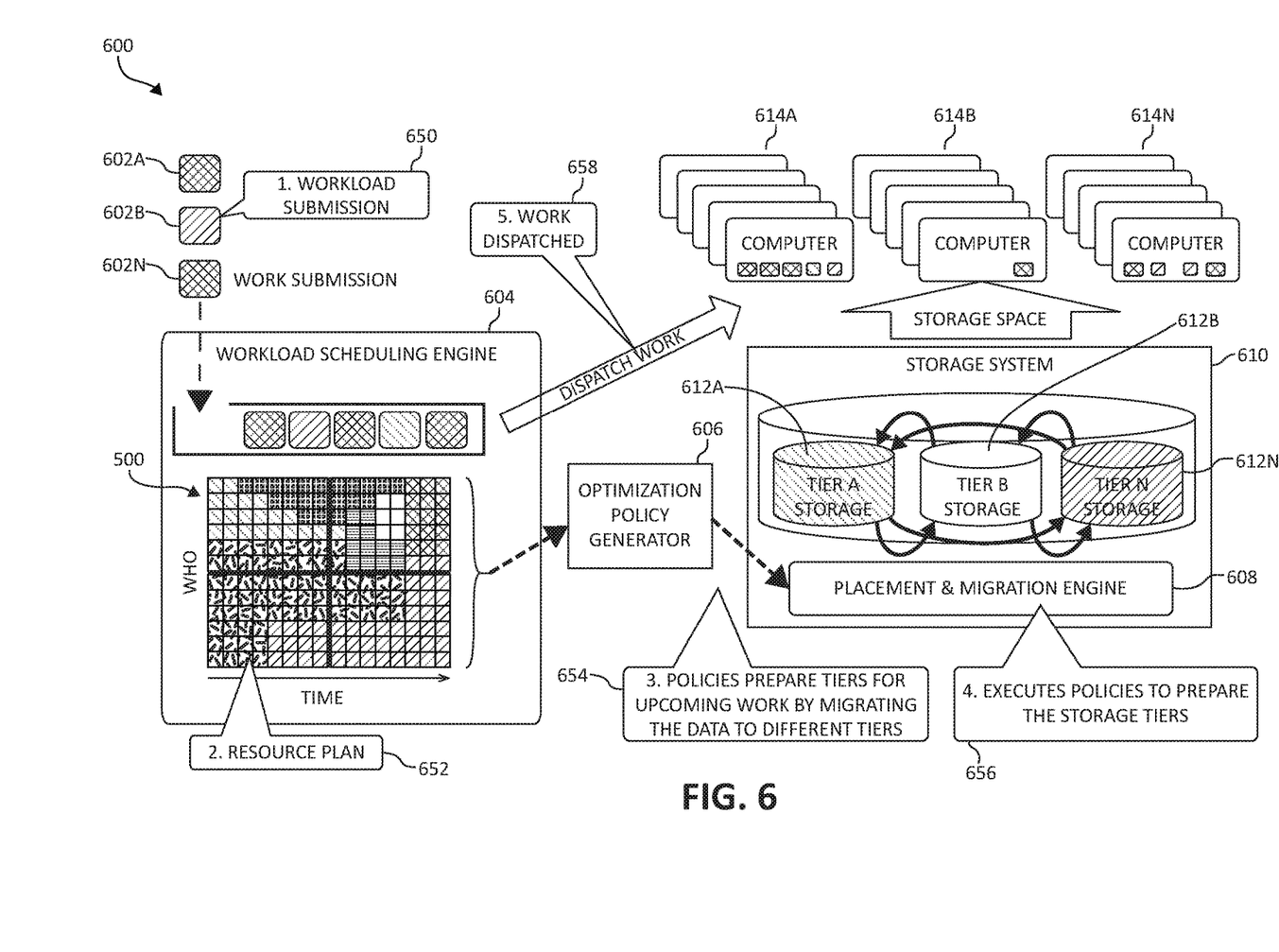
FIG. 6 is a combination block and flowchart diagram illustrating an exemplary method for resource management in a tiered data storage system, by which aspects of the present invention may be implemented.

FIG. 6 depicts a combination flowchart/block diagram of a method 600 for resource management in a tiered data storage system, in accordance with one embodiment of the present invention. The method 600 may be performed in accordance with the present invention in any of the environments depicted in FIGS. 1-4, among others, in various embodiments. Of course, more or less operations than those specifically described in FIG. 6 may be included in method 600, as would be understood by one of skill in the art upon reading the present descriptions.

Each of the steps of the method 600 may be performed by any suitable component of the operating environment. For example, in various embodiments, the method 600 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an ASIC, a FPGA, etc., combinations thereof, or any other suitable computing device known in the art.

Included in the flowchart/diagram 600 are workloads 602A, 602B, and 602n (each of which have unique resource requirements); a workload scheduling engine 604; an optimization policy generator 606; a multi-tier storage system 610 including a placement and migration engine 608, storage tier A 612A, storage tier B 612B, and storage tier N 612n; and a plurality of computers labeled 614A, 614B, and 614n.

As one of ordinary skill in the art would appreciate, the storage tiers 612A-n may be arranged in a hierarchy where each tier comprises separate and distinct hardware and performance characteristics, similarly to those shown in FIG. 4. The workload scheduling engine 604, the optimization policy generator 606, and the placement and migration engine 608 may work in conjunction with each and every component of the storage system 610 and computers 614A-n. The workload scheduling engine 604, the optimization policy generator 606, and the placement and migration engine 608 may be structurally one complete module or may be associated and/or included with other individual modules or systems (e.g., storage system 610). Additionally, the workload scheduling engine 604, the optimization policy generator 606, and the placement and migration engine 608 may each comprise physical modules or other programmable circuitry, or may each comprise computer code or executable instructions and may individually and/or collectively perform various aspects of the present invention as will be further described.

Within flowchart/diagram 600, a method for resource management in a tiered data storage system is illustrated, each ascending numeral proceeding through the method as will be discussed. The method begins when the users of a workload management system (not illustrated per se) submit workloads (e.g., workloads 602A-n) to the workload scheduling engine 604 (step 650). The workloads 602A-n may demand access to existing data and/or to create new data, and the storage demands of each respective workload will present different requirements on the layout of the data in the storage tiers 612A-n. Of course, the submitted workloads 602A-n each require certain resources (CPU, memory, and storage tier 612A-n resources) in order to complete, and tenants compete for these resources to run their particular workload 602A-n. Using the mechanisms described herein, the workload manager is responsible for finding and allocating these resources to each tenant.

The workload manager administrator analyzes the submitted workloads 602A-n and develops a resource plan 500 (step 652). The resource plan 500 defines what specific resources of the storage system 610 a particular group of tenants can utilize, and at what time the particular group can utilize the defined resources. This allows the resources of the storage system 610 to be aligned with business requirements or Service Level Agreements (SLAs) of the individual tenants. It also provides critical applications the CPU and memory (or other hardware/software) resources that may be needed at a given time.

The resource plan 500 is extended to also include the storage tiers 612A-n of the storage system 610. The administrator of the system defines how much (i.e., what quantity of space) of each storage tier 612A-n each tenant is entitled to and at what time. This allows the peak demand summed over all tenants to exceed the capacity of the individual storage tiers 612A-n. A storage portion of the resource plan 500 (the portion of the resource plan 500 provided to the storage system 610) is presented to the optimization policy generator 606 by the workload manager to translate the storage portion of the resource plan 500 into a form the storage system 610 can process.

As time progresses, the allotment of resources to particular tenants and workloads 602A-n will change. The resource plan 500 thus provides the allocations of resources per each tenant and per each of the storage tiers 612A-n, from which the optimization policy generator 606 generates placement and migration policies to prepare data stored in the storage system 610 for the workloads 602A-n (step 654).

Once the placement and migration policies have been computed by the optimization policy generator 606 using the resource plan 500 allocations and policies as discussed above, the placement and migration policies are then executed by the placement and migration engine 608 in accordance with the direction provided by the optimization policy generator 606 within the storage system 610 (step 656). For example, when new data is to be created, the placement and migration engine 608 may choose to place the data in alternate storage tiers 612A-n, and when existing data is to be accessed, the placement and migration engine 608 may relocate the existing data to alternate storage tiers 612A-n in accordance with the policy created by the optimization policy generator 606.

Finally, the workload manager dispatches the workloads 602A-n from within the workload scheduling engine 604 to computers 614A-n (step 658). The computers 614A-n access the storage space provided by the storage system 610, and the workload manager dispatches respective workloads 602A-n to the computers 614A-n. The workloads 602A-n running on the computers 614A-n will access the storage system 610 to either read data, write data, or some combination thereof. The storage system 610 will have prepared and optimized the data placement in the storage tiers 612A-n for the work that will be performed, and thus provide capacity in the different storage tiers 612A-n that is now aligned with the resource plan 500 provided by the workload manager.

Figure 7:
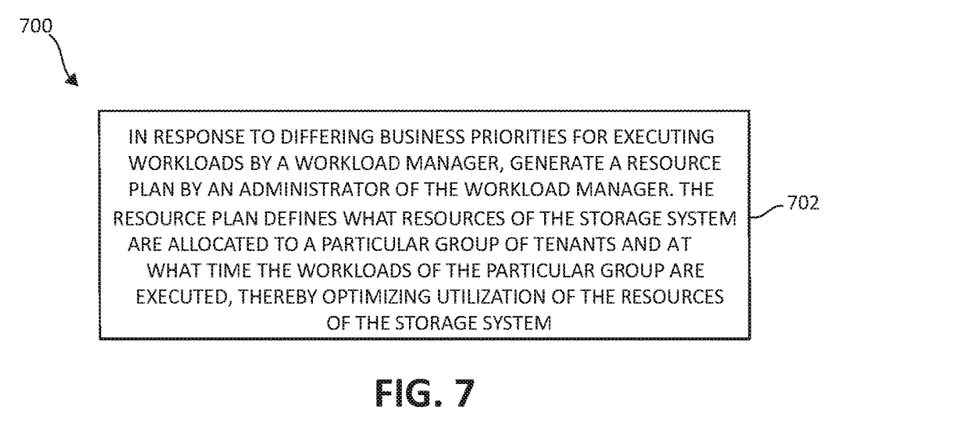
FIG. 7 is a flowchart diagram illustrating an exemplary method for resource management in a tiered data storage system, by which aspects of the present invention may be implemented.

Reviewing these concepts, FIG. 7 illustrates a method 700 for data management in a tiered data storage system, in accordance with one embodiment of the present invention. The method 700 may be performed in accordance with the present invention in any of the environments depicted in FIGS. 1-4, among others, in various embodiments. Of course, more or less operations than those specifically described in FIG. 7 may be included in method 700, as would be understood by one of skill in the art upon reading the present descriptions.

Each of the steps of the method 700 may be performed by any suitable component of the operating environment. For example, in various embodiments, the method 700 may be partially or entirely performed by a processor, or some other device having one or more processors therein. The processor, e.g., processing circuit(s), chip(s), and/or module(s) implemented in hardware and/or software, and preferably having at least one hardware component may be utilized in any device to perform one or more steps of the method 600. Illustrative processors include, but are not limited to, a CPU, an ASIC, a FPGA, etc., combinations thereof, or any other suitable computing device known in the art.

The method 700 begins by, in response to differing business priorities for executing workloads 602A-n by a workload manager, generating a resource plan 500 by an administrator of the workload manager. The resource plan 500 defines what resources (CPU, memory, storage tiers 612A-n, etc.) of the storage system 610 are allocated to a particular group of tenants and at what time the workloads 602A-n of the particular group are executed, thereby optimizing utilization of the resources of the storage system (step 702).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowcharts and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowcharts and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowcharts and/or block diagram block or blocks.

The flowcharts and block diagrams in the Figures illustrate the architecture, functionality, and operation of possible implementations of systems, methods, and computer program products according to various embodiments of the present invention. In this regard, each block in the flowcharts or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, can be implemented by special purpose hardware-based systems that perform the specified functions or acts or carry out combinations of special purpose hardware and computer instructions.

The invention claimed is:

1. A method for managing resources in a tiered data storage system, by a processor device, comprising:
   in response to differing business priorities for executing workloads by a workload manager, generating a resource plan by an administrator of the workload manager, wherein the resource plan defines what resources of the storage system are allocated to a particular group of tenants and at what time the workloads of the particular group are executed, thereby optimizing utilization of the resources of the storage system;
   extending the resource plan to include each one of a plurality of storage tiers of the data storage system, wherein the administrator defines a quantity of a particular one of the plurality of storage tiers to be allocated for use by a respective one of the tenants; and
   defining, by the administrator, a time period of which the particular one of the plurality of storage tiers is allocated for use by the respective one of the tenants, wherein a peak demand summed over all of tenants is allowed to exceed a total capacity of each individual one of the plurality of storage tiers.

2. The method of claim 1, further including submitting a storage portion of the resource plan to an optimization policy generator, wherein the optimization policy generator, over a predetermined timeframe, translates the storage portion of the resource plan into placement and migration policies to be executed for data stored in the storage system.

3. The method of claim 2, further including migrating or initially placing the data, by the storage system, in at least one of the plurality of storage tiers in accordance with the placement and migration policies received by the optimization policy generator.

4. The method of claim 1, further including dispatching each of the workloads by the workload manager to at least one of a plurality of computers, wherein the storage system provides capacity of each of the plurality of storage tiers aligned with the resource plan maintained by the workload manager.

5. The method of claim 1, wherein the resources are selected from a list comprising at least Central Processing Unit (CPU), memory, and storage resources; and
   the resource plan is associated with business requirements or a Service Level Agreement (SLA).

6. A system for managing resources in a tiered data storage system, the system comprising:
   a processor device executing instructions stored in a memory, wherein the processor device:
   in response to differing business priorities for executing workloads by a workload manager, generates a resource plan by an administrator of the workload manager, wherein the resource plan defines what resources of the storage system are allocated to a particular group of tenants and at what time the workloads of the particular group are executed, thereby optimizing utilization of the resources of the storage system;

extends the resource plan to include each one of a plurality of storage tiers of the data storage system, wherein the administrator defines a quantity of a particular one of the plurality of storage tiers to be allocated for use by a respective one of the tenants; and receives input, by the administrator, defining a time period of which the particular one of the plurality of storage tiers is allocated for use by the respective one of the tenants, wherein a peak demand summed over all of tenants is allowed to exceed a total capacity of each individual one of the plurality of storage tiers.

7. The system of claim 6, wherein the processor device submits a storage portion of the resource plan to an optimization policy generator, wherein the optimization policy generator, over a predetermined timeframe, translates the storage portion of the resource plan into placement and migration policies to be executed for data stored in the storage system.

8. The system of claim 7, wherein the processor device migrates or initially places the data, by the storage system, in at least one of the plurality of storage tiers in accordance with the placement and migration policies received by the optimization policy generator.

9. The system of claim 6, wherein the processor device dispatches each of the workloads by the workload manager to at least one of a plurality of computers, wherein the storage system provides capacity of each of the plurality of storage tiers aligned with the resource plan maintained by the workload manager.

10. The system of claim 6, wherein the resources are selected from a list comprising at least Central Processing Unit (CPU), memory, and storage resources; and the resource plan is associated with business requirements or a Service Level Agreement (SLA).

11. A computer program product for managing resources in a tiered data storage system, by a processor device, the computer program product embodied on a non-transitory computer-readable storage medium having computer-readable program code portions stored therein, the computer-readable program code portions comprising:

an executable portion that, in response to differing business priorities for executing workloads by a workload manager, generates a resource plan by an administrator of the workload manager, wherein the resource plan defines what resources of the storage system are allocated to a particular group of tenants and at what time the workloads of the particular group are executed, thereby optimizing utilization of the resources of the storage system;

an executable portion that extends the resource plan to include each one of a plurality of storage tiers of the data storage system, wherein the administrator defines a quantity of a particular one of the plurality of storage tiers to be allocated for use by a respective one of the tenants; and an executable portion that receives input, by the administrator, defining a time period of which the particular one of the plurality of storage tiers is allocated for use by the respective one of the tenants, wherein a peak demand summed over all of tenants is allowed to exceed a total capacity of each individual one of the plurality of storage tiers.

12. The computer program product of claim 11, further including an executable portion that submits a storage portion of the resource plan to an optimization policy generator, wherein the optimization policy generator, over a predetermined timeframe, translates the storage portion of the resource plan into placement and migration policies to be executed for data stored in the storage system.

13. The computer program product of claim 12, further including an executable portion that migrates or initially places the data, by the storage system, in at least one of the plurality of storage tiers in accordance with the placement and migration policies received by the optimization policy generator.

14. The computer program product of claim 11, further including an executable portion that dispatches each of the workloads by the workload manager to at least one of a plurality of computers, wherein the storage system provides capacity of each of the plurality of storage tiers aligned with the resource plan maintained by the workload manager.

15. The computer program product of claim 11, wherein the resources are selected from a list comprising at least Central Processing Unit (CPU), memory, and storage resources; and the resource plan is associated with business requirements or a Service Level Agreement (SLA).

* * * * *